(12) United States Patent
Emo et al.

(10) Patent No.: US 7,515,376 B2
(45) Date of Patent: Apr. 7, 2009

(54) DISK DRIVE WITH VARIABLE TRACK DENSITY

(75) Inventors: Bruce D. Emo, Boulder, CO (US); Brian D. Wilson, Boulder, CO (US)

(73) Assignee: Mobile Storage Technology, Inc., Milpitas, CA (US)

( * ) Notice: Subject to any disclaimer, the term of this patent is extended or adjusted under 35 U.S.C. 154(b) by 0 days.

(21) Appl. No.: 12/075,040

(22) Filed: Mar. 7, 2008

(65) Prior Publication Data

US 2008/0151417 A1 Jun. 26, 2008

Related U.S. Application Data

(62) Division of application No. 09/501,711, filed on Feb. 10, 2000, now Pat. No. 7,342,741.

(51) Int. Cl.
*G11B 5/596* (2006.01)

(52) U.S. Cl. .................................... 360/78.07
(58) Field of Classification Search ........................ None
See application file for complete search history.

(56) References Cited

U.S. PATENT DOCUMENTS

| | | | |
|---|---|---|---|
| 5,321,560 A | 6/1994 | Cowen | |
| 5,379,171 A | 1/1995 | Morehouse et al. | |
| 5,448,433 A | 9/1995 | Morehouse et al. | |
| 5,596,458 A | 1/1997 | Emo et al. | |
| 6,061,195 A | 5/2000 | Wilson et al. | |
| 6,091,559 A * | 7/2000 | Emo et al. | 360/48 |
| 7,342,741 B1 * | 3/2008 | Emo et al. | 360/78.07 |

OTHER PUBLICATIONS

"Magnetic Disk Drive Technology," by Kanu G. Ashar, published by IEEE Press, ISBN 0-7803-1083-7, (c) 1997 by the Institute of Electrical and Electronics Engineers, Inc., New York, NY, pp. 70-162 and 257-259.
Engineers, Inc., New York, NY, pp. 70-162 and 257-259.

* cited by examiner

*Primary Examiner*—K. Wong
(74) *Attorney, Agent, or Firm*—Saile Ackerman LLC; Stephen B. Ackerman

(57) ABSTRACT

A method of manufacturing a disk drive is disclosed in which servo information is written in tracks on a disk surface, the track width performance of the associated read/write transducer is measured, the track width performance is analyzed and a data track pitch is established. Based on the data track pitch established, a track location formula for data tracks on the surface is defined. For a disk drive with a plurality of read/write transducer-media surface combinations, a track location formula for data tracks is established for each combination. Disclosed is a method of measuring a track width performance of a read/write transducer which includes the steps of writing a first test pattern having a first waveform with the read/write transducer at location t on the surface of a magnetic medium, reading the first test pattern and measuring an error rate of the signal, followed by moving the read/write transducer in a first direction a predetermined distance from location t and writing a second test pattern comprised of a waveform different than the first waveform, moving the read/write transducer in a second direction to a position distance d from location t and writing a third test pattern comprised of a waveform different to the first test pattern. The first test pattern is read at location t and the error rate of the signal is measured. A disk drive including a disk having a first magnetic surface, a first read/write transducer associated with the first magnetic surface for reading and writing data in tracks in a plurality of zones each zone having a read/write frequency, a first load beam for supporting and positioning the first read/write transducer at a plurality of locations above the surface of the magnetic media as disclosed and the drives produced utilizing the steps of writing servo information in tracks on the surface at a track pitch, followed by measuring a track width performance of the read/write transducer and establishing a track pitch for data tracks as a function of the measured track width performance.

24 Claims, 9 Drawing Sheets

DISK DRIVE WITH VARIABLE TRACK DENSITY

This is a Divisional Application of U.S. patent application Ser. No. 09/501,711, filed on Feb. 10, 2000, now U.S. Pat. No. 7,342,741 which is herein incorporated by reference in its entirety and assigned to a common assignee.

FIELD OF THE INVENTION

This invention relates to the storage of information on magnetic media, and more particularly to storage of information on moving magnetic media.

BACKGROUND

It is desirable in recording information on magnetic media to improve and increase the areal recording density to maximize the storage available in a given product based upon the components of that product. Several techniques are currently available such as, for example, those described in U.S. Pat. No. 5,596,458 issued Jan. 21, 1997 to Bruce D. Emo and Brian D. Wilson entitled "Variable Zone Layout For Information Storage Disk Drive," also referred to hereinafter as the '458 patent. This patent is assigned to assignee of the present application and the patent is incorporated herein by reference in its entirety. In the '458 patent, variable zones are established having boundaries which are a function of the read/write transducer recording performance. The measured read/write performance is used to establish zone boundaries and read/write frequencies for use in each zone. The range of read/write frequencies to be used for each read/write transducer is established by measuring the read/write performance of the transducer. In assembly of a disk drive, for example, using the techniques disclosed in the '458 patent, drive servo information is written in tracks to define a data track pitch based on expected track width characteristics of the read/write transducer selected for use in the drive. A layout of data zones and their respective frequencies is performed.

In addition to considering the read/write performance characteristics of read/write transducers and the establishment of zone layouts, measurement of the track width recording performance of a read/write transducer may be utilized to increase the areal recording density. By packing more closely together tracks of data by using the advantages gained from a narrower track width recording head, the areal density may be increased and thus the recording surface may be customized based on the measured track width of signals written by a read/write transducer. This is described in copending commonly assigned U.S. patent application Ser. No. 08/966,591 filed Nov. 10, 1997, also referred to hereinafter as the '591 application, which is a continuation of U.S. patent application Ser. No. 08/538,662 filed Nov. 2, 1995, by Bruce D. Emo and Brian D. Wilson entitled "Variable Zone Layout and Track Pitch Parameter Considerations for Information Storage Disk Drive," issued on Dec. 21, 1999 as U.S. Pat. No. 6,005,725. The '591 application is incorporated herein by reference in its entirety. In the '591 application, techniques are described for measuring the track width of read/write transducers and for using the results of the track width to establish a track pitch for a media to be used in association with the read/write transducer. After the track pitch is established servo information is written in tracks using the measured track width to establish the track pitch to be used. If the device using the above described techniques includes a plurality of recording surfaces, the track pitch for each surface is customized to maximize the areal recording density. However, in each read/write transducer media combination a unique track pitch may be established. Thus, a servo track writing operation with unique pitch spacings will be required for each surface. In addition to considering the track width recording performance in producing the disk drive, the read/write recording performance as described above in the '458 patent may also be used in constructing disk drive to further increase the recording capability of a disk drive product.

While both of the foregoing techniques are very useful and provide advantageous products, it is desirable to increase the efficiency in manufacturing a product when the track width is being considered as a parameter for maximization of the storage to be able to write each surface of the magnetic media with a common servo track pitch rather than individualizing the surfaces based on the measured track width performance.

SUMMARY

In accordance with the present invention, a method of defining locations of data tracks for surface of a magnetic medium is provided, the magnetic medium having associated therewith a read/write transducer. In the method, servo information is written in tracks on a surface of the magnetic medium at a track pitch, the track width performance of the read/write transducer is measured, and a track pitch for data tracks is established based on the track width performance measured.

In another embodiment, the track pitch for the data tracks is established to be different than the track pitch for the servo tracks.

In one embodiment of the present invention, the track width performance is measured using an error rate measurement technique.

In accordance with another aspect of the present invention, a disk drive is provided, the disk drive including a disk having a first magnetic surface and a first read/write transducer associated with the first magnetic surface for reading and writing data in tracks in a plurality of zones, each zone having a read/write frequency, the drive including a load beam for supporting and positioning the read/write transducer at a plurality of locations above the first magnetic surface, the disk drive being produced using the steps of writing servo information in tracks on the disk surface at a track pitch; measuring a track width performance of the read/write transducer; and establishing a track pitch for the data tracks as a function of the measured track width performance of the read/write transducer.

In accordance with another aspect of the present invention, the disk drive is produced using the further step of defining a data track location formula as a function of a servo track location. As a further step in manufacturing a disk drive, the track location formula is stored in a memory. A disk drive in accordance with the present invention is produced using the further steps of measuring a recording density performance of the read/write transducer with respect to the first magnetic surface, and establishing the radial boundaries and a read/write frequency for each zone as a function of the recording density performance of the first read/write transducer. In a further aspect of the present invention, a disk drive is produced using the step of measuring a distance of travel of the read/write transducer to determine a number of data tracks available; and the disk drive is produced using the further step of defining radial boundaries of a plurality of zones as a function of the number of data tracks available.

In yet another aspect of the present invention, a method is provided for manufacturing a disk drive comprising a disk having a first magnetic surface and a first read/write transducer associated with the first magnetic surface for reading and writing data in tracks. The method comprises the steps of writing servo information in tracks on the magnetic surface at a track pitch; measuring a track width performance of the read/write transducer; and establishing a track pitch for data tracks as a function of the measured track width performance of the read/write transducer. In a further aspect, the method includes the step of defining a data track location formula as a function of a servo track location. The method further includes the step of storing the data track location formula in a memory. In another aspect of the invention, the method of manufacturing a disk drive includes the steps of measuring a recording density performance of the first read/write transducer with respect to the first magnetic surface and establishing radial boundaries and a read/write frequency for a plurality of zones as a function of the recording density performance of the first read/write transducer. In a further aspect, the method may include the step of measuring a distance of travel of the read/write transducer to determine a number of data tracks a plurality of zones, each zone having a read/write frequency, the drive including a load beam for supporting and positioning the read/write transducer at a plurality of locations above the first magnetic surface, the disk drive being produced using the steps of writing servo information in tracks on the disk surface at a track pitch; measuring a track width performance of the read/write transducer; and establishing a track pitch for the data tracks as a function of the measured track width performance of the read/write transducer.

In accordance with another aspect of the present invention, the disk drive is produced using the further step of defining a data track location formula as a function of a servo track location. As a further step in manufacturing a disk drive, the track location formula is stored in a memory. A disk drive in accordance with the present invention is produced using the further steps of measuring a recording density performance of the read/write transducer with respect to the first magnetic surface, and establishing the radial boundaries and a read/write frequency for each zone as a function of the recording density performance of the first read/write transducer. In a further aspect of the present invention, a disk drive is produced using the step of measuring a distance of travel of the read/write transducer to determine a number of data tracks available; and the disk drive is produced using the further step of defining radial boundaries of a plurality of zones as a function of the number of data tracks available.

In yet another aspect of the present invention, a method is provided for manufacturing a disk drive comprising a disk having a first magnetic surface and a first read/write transducer associated with the first magnetic surface for reading and writing data in tracks. The method comprises the steps of writing servo information in tracks on the magnetic surface at a track pitch; measuring a track width performance of the read/write transducer; and establishing a track pitch for data tracks as a function of the measured track width performance of the read/write transducer. In a further aspect, the method includes the step of defining a data track location formula as a function of a servo track location. The method further includes the step of storing the data track location formula in a memory. In another aspect of the invention, the method of manufacturing a disk drive includes the steps of measuring a recording density performance of the first read/write transducer with respect to the first magnetic surface and establishing radial boundaries and a read/write frequency for a plurality of zones as a function of the recording density performance of the first read/write transducer. In a further aspect, the method may include the step of measuring a distance of travel of the read/write transducer to determine a number of data tracks available. Additionally, the method may also include the step of defining radial boundaries of a plurality of zones as a function of the number of data tracks available.

In yet another aspect of the present invention, a series of disk drives is provided in which the drives are each assembled from a predetermined set of components for a head disk assembly and for drive electronics. The head disk assembly includes a disk having a first magnetic surface and a first read/write transducer associated with the first magnetic surface. In a first drive of the series the first magnetic surface includes a plurality of data tracks and a plurality of servo tracks and in the first drive of the series the data tracks and servo tracks have a first servo-to-data track pitch relationship. In a second drive of said series the servo-to-data track pitch relationship of the first magnetic surface is different than the first servo-to-data track pitch relationship of the first drive of the series.

In a further aspect of the present invention, a series of disk drives is provided as set forth immediately above in which each head disk assembly of the drives in the series the disk each includes a second magnetic surface, and each head disk assembly also includes a second read/write transducer associated with the second magnetic surface. In the first drive of the series the second magnetic surface includes a plurality of servo tracks having a track pitch and a plurality of data tracks having a track pitch different than the servo track pitch thereby defining a servo-to-data track pitch relationship, and the servo-to-data track pitch relationship for the second magnetic surface is different than the servo-to-data track pitch relationship of the first magnetic surface.

BRIEF DESCRIPTION OF THE DRAWINGS

The present invention may be better understood, and its numerous objects, features, and advantages-made apparent to those skilled in the art by referencing the accompanying drawings.

The use of the same reference symbols in different drawings indicates similar or identical items.

DETAILED DESCRIPTION

The present invention is particularly applicable to the manufacture of rigid disk drives which include a head disk assembly which is mated with a circuit board to provide drive electronics for the recording and playback of information stored on a surface of a magnetic disk. A head disk assembly is generally understood by those skilled in the art to comprise a disk supported for rotation about an axis, and an actuator to move a read/write transducer to a plurality of locations above the surface of the disk. The actuator may be of the rotary type such as that described in U.S. Pat. No. 5,448,433, issued Sep. 5, 1995 entitled "Disk Drive Information Storage Device With Baseplate And Cover Having Overlapping Edge Portions To Provide Protection From Electromagnetic Interference" by James H. Morehouse, et al., or a rotary actuator disk drive such as that disclosed in U.S. patent application Ser. No. 07/766,480 filed Sep. 25, 1991 by James H. Morehouse et al. Entitled "Microminiature Hard Disk Drive", now U.S. Pat. No. 5,379,191. It also, of course, will be appreciated that the invention described herein may be utilized in conjunction with disk drives of the dynamic head loading type, the contact start stop type, as well as disk drives utilizing linear actuators. The two above-identified Morehouse et al. Patents, which are incorporated herein by reference in their entirety, are exemplary of hard disk assembly structures suitable use in practicing the present invention.

In addition to the head disk assembly, drive electronics associated with the head disk assembly are utilized to accomplish the reading and writing of information from a surface of a disk including a magnetic coating. It will be appreciated by those skilled in the art that numerous types of drive electronic circuits may be utilized in practicing the present invention. An example of a suitable drive electronics which may be utilized in building a disk drive in accordance with applicants' invention are described in U.S. Pat. No. 5,321,560 to Stephen R. Cowen issued Jun. 14, 1994. This patent is incorporated by reference herein in its entirety.

Figure 1:
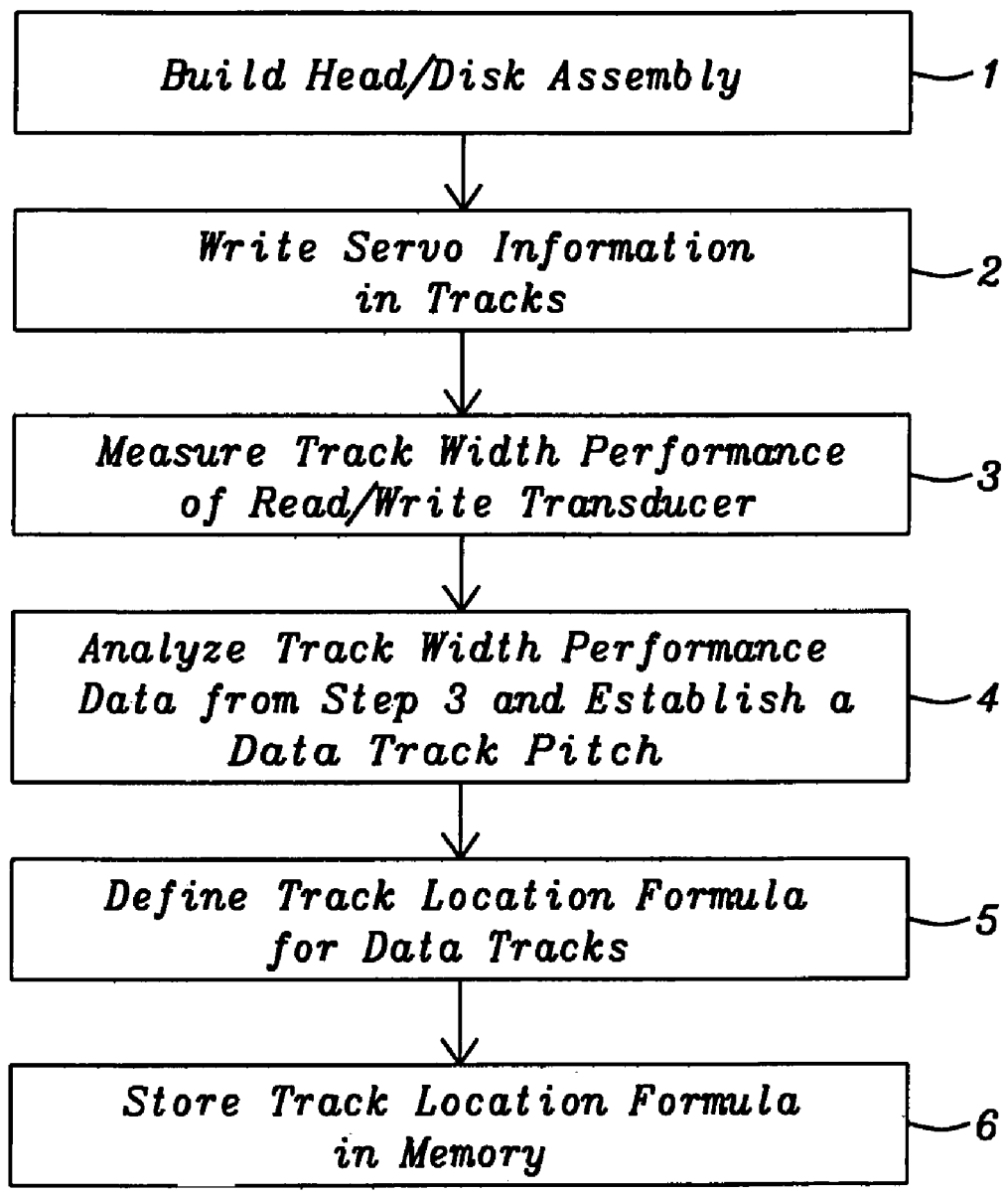
FIG. 1 is a flow chart illustrating steps used in the practice of the present invention.

Turning to FIG. 1, a flow chart is illustrated which includes the preliminary steps for producing a disk drive in accordance with the present invention. More particularly, the flow chart in FIG. 1 illustrates the process to be used for establishing the location of data tracks for one read/write transducer-memory surface combination. A disk drive having a plurality of read/write transducer-media pair combinations will require repeating the steps illustrated in FIG. 1 for each combination.

As will be fully described below, the results of performing the steps in FIG. 1 provide data to define track location formula for each of the data tracks on a media surface as a function of servo track information written on the recording medium in the process performed in step 2. Thus, executing a seek command-involves using the track location formula data stored in memory to determine the data track location as a function of the servo track which corresponds to the desired data track.

Referring again to FIG. 1, step 2 may be performed, for example, by recording servo information as described in the Cowen '560 patent referred to above. In the Cowen patent, the technique for servo positioning involves the recording of a normal frame in the position sub-field as well as a quadrature frame in the position sub-field. This position information is demodulated by suitable circuits well known to those skilled in the art to produce a normal position signal and a quadrature position signal which is offset in phase by a difference of 90° from the normal position signal.

Figure 2:
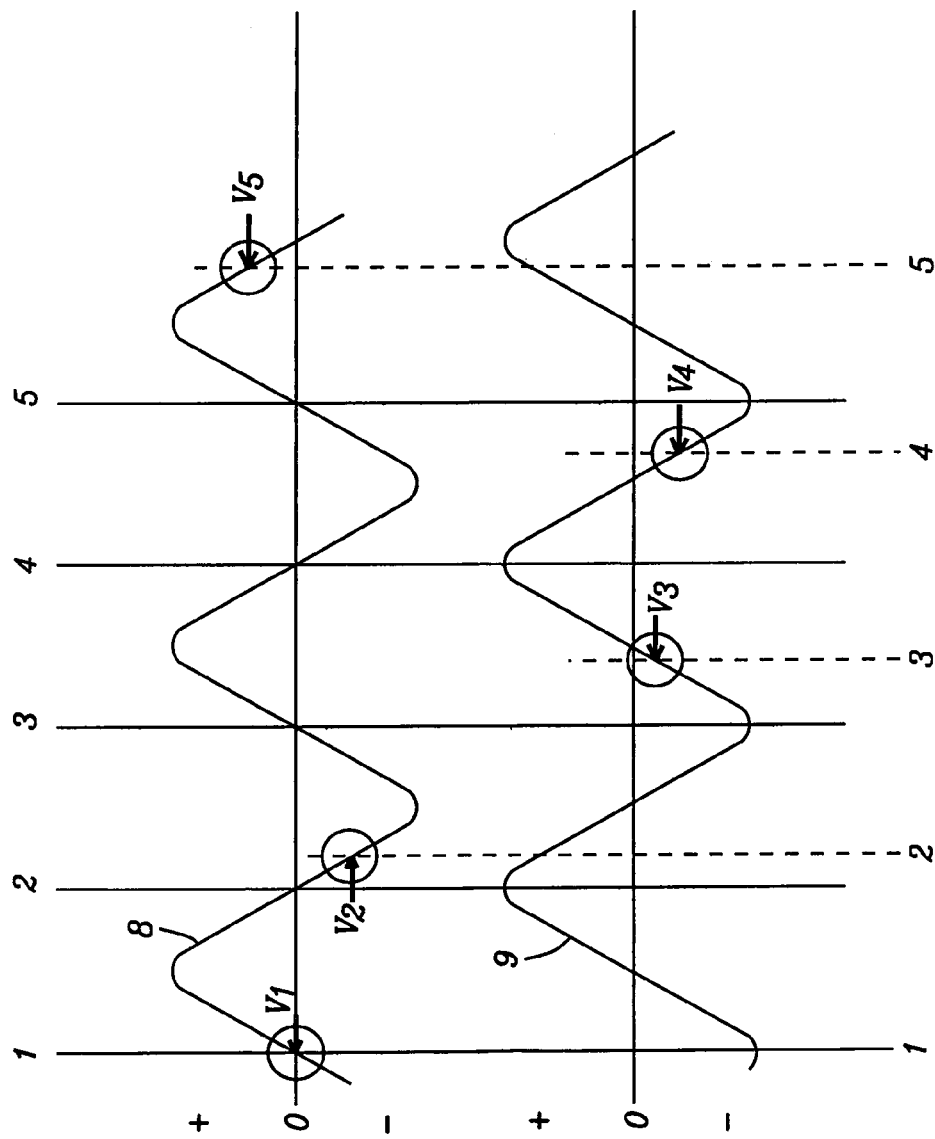
FIG. 2 illustrates a demodulated signal pair with a normal position signal and a quadrature position signal read from a servo track.

FIG. 2 illustrates a demodulated signal pair with the normal position signal illustrated in the upper portion of FIG. 2 and indicated by reference character 8, and the quadrature position signal indicated in the lower portion of FIG. 2 and indicated by reference character 9. For this illustration and the example which will be explained below, the servo tracks are illustrated by the solid vertical lines and the data tracks, except in the case of data track 1 which coincides with servo track 1, are illustrated in vertical dashed lines. As will be appreciated by reference to FIG. 2, the data tracks are offset from the servo tracks, again except in the instance of data track 1. As illustrated in FIG. 2, which is an illustrative example of a hypothetical performance of a read/write transducer with respect to an associated magnetic surface, the servo information has been recorded at a track pitch which is greater than the track pitch established for the read/write transducer. In practicing the present invention as has been pointed out above, the servo information is recorded in tracks prior to a measurement process to determine track width performance of the associated read/write transducer. In this particular example illustrated in FIG. 2, the servo tracks are written at a track pitch which is greater than the expected usable track pitch for acceptable performance with read/write transducers to be used in the disk drive. In this example, the ratio is 1.2, which results in data track 2 being at servo track position 2.2. In similar fashion, it will be noted that data track 3 is between servo tracks 3 and 4, and its position is servo track 3.4, which results from adding 1.2 to 2.2, the position of data track 2. As illustrated in FIG. 1, a track location formula for data tracks is defined based on the read/write transducer-associated media performance and the track formula data is stored in memory in the disk drive to permit locating the requested data track as function of the servo track position.

It has been found desirable to record the servo tracks at a pitch somewhat greater than or equal to, the expected data track pitch based on the expected track width of read/write transducers being used to construct the disk drive. Alternatively, although as illustrated in FIG. 2 the servo track pitch is greater than the resulting data track pitch, it is possible to achieve the advantageous manufacturing efficiencies of the present invention by recording the servo tracks at a slightly lesser pitch than the expected data track pitch which would result in the data tracks being more closely spaced than the servo tracks. Following the track spacing technique illustrated in FIG. 2, it has been found that best results are obtained when the expected minimum head track width dimension lies above 60% of the servo track spacing.

In FIG. 2, the positions on the normal and quadrature signals adjacent arrows $V_1$, $V_2$, $V_3$, $V_4$, and $V_5$ indicate the points on the normal position signal 8 and quadrature position signal 9 which are used to establish the data track locations for data tracks 1, 2, 3, 4, and 5. It will be noted that at the indicated locations the signals exhibit linear slopes. The slope of the track servo position signal is predetermined and can be used by the servo system to control track position if the slope and intercept voltage are known. The slope determines the servo polarity, while the intercept determines the desired track null position. In practice, an AGC or other normalization process calibrates the magnitude of both servo signals such that intercept voltage can be predicted as a function of track position offset. Additionally, the slope is predictable from the know pre-written servo position signal pattern, and it is also known which of the two servo signals will be linear at the data track locations. For example, in the instance of data track 3 illustrated in FIG. 2, only the quadrature position signal 9 is linear at the data track 3 location. Thus, that signal is used for positioning to data track 3. In the case of data track 2, both the normal position signal 8 and the quadrature position signal 9 are linear at the data track 2 location, thus either signal could be utilized for seeking and following data track 2.

Referring to FIG. 2, it will be noted that the normal position signal 8 is selected for data track 1 and the intercept voltage $V_1$ is zero Volts because the data track position is coincident with the centerline of the servo track position. The intercept voltage for the other data track positions illustrated in FIG. 2 are a mixture of negative and positive voltages, which as mentioned above, are selected based on the position signal being utilized having a linear slope at the data track location being sought. It will be appreciated from the above that any track location can be synthesized by using one or the other of the normal position signal 8 and quadrature position signal 9 by selecting the appropriate intercept voltage for the desired data track.

Returning to FIG. 1, after writing servo information in tracks as described above, and indicated in step 2 of the flow chart, the next action taken is to measure the track width performance of the read/write transducer with respect to its associated media surface. The performance measurements may be performed in a number of ways, three of which are described below. The goal in establishing a track pitch for data tracks is, of course, to have the track pitch as high as possible, but not so high that the read/write recording performance is below an acceptable level for the product.

One method of measuring track width performance of a read/write transducer involves writing a test pattern on the associated magnetic media surface using the read/write transducer, reading the test pattern and measuring an amplitude of the signal, then erasing a portion of the test pattern, followed by reading the test pattern and comparing the amplitude of the signal with the amplitude of the signal measured before the erase step.

Figure 3:
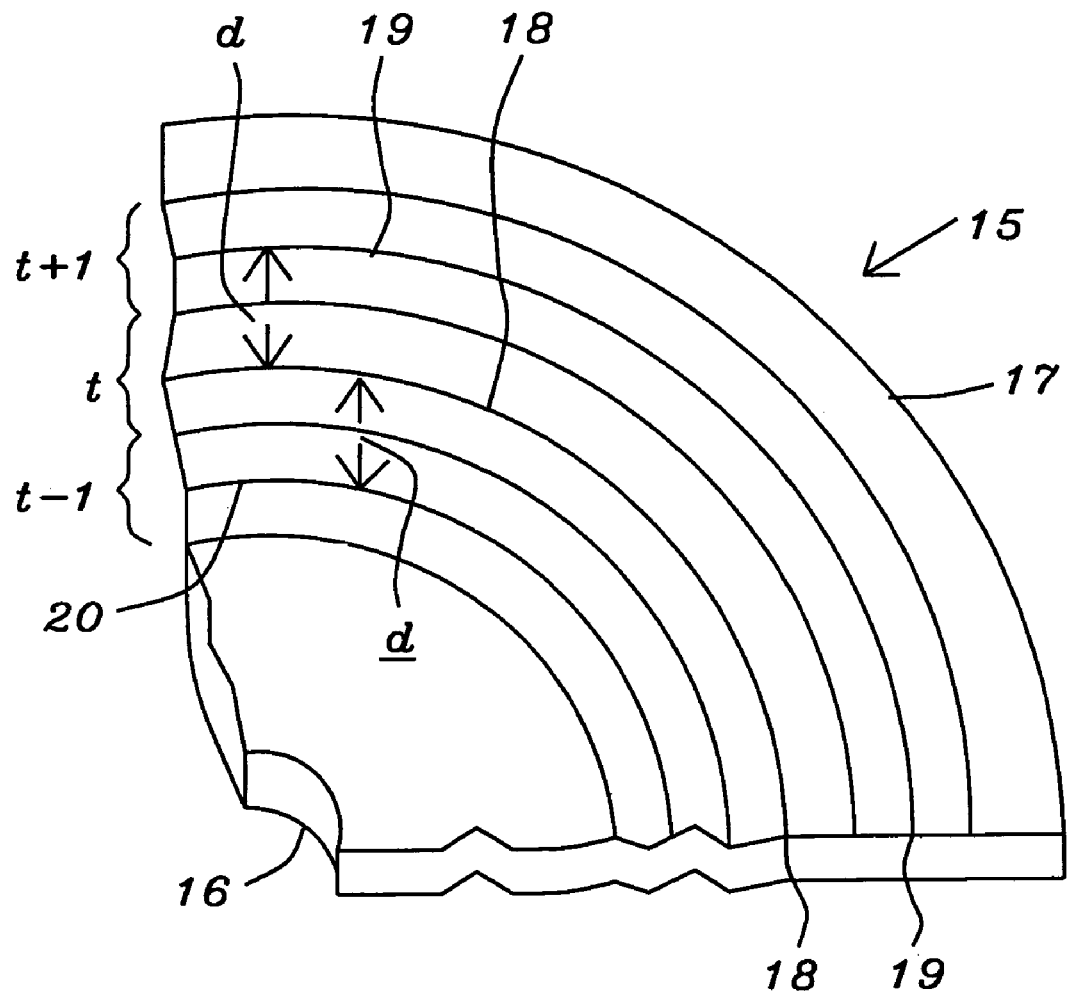
FIG. 3 is a perspective view of a portion of a magnetic recording disk.

Reference is made to FIG. 3 in conjunction with the following explanation of a technique usable for step 3 in FIG. 1, measurement of the track width performance for a read/write transducer. Referring to FIG. 3, magnetic recording disk 15 is shown in a perspective, partial diameter view, with inside diameter (ID) indicated at 16 and outside diameter (OD) indicated at 17. In determining a track width performance of a single track written by a read/write transducer, a data pattern is written at track t, the center line of which is indicated by reference character 18. Although track t may be arbitrarily located at various positions on the disk surface, a position near the outer edge of the data area is preferable. The written test pattern should preferably be a constant frequency NRZ signal having a constant amplitude. The frequency of the test pattern is preferably at or near the highest recording frequency which is expected to be used in the disk drive. One technique which may be used in testing for track width performance is to utilize any standard, well-known head gimbal assembly (HGA) tester to position the read/write transducer mounted as part of an HGA above the surface of magnetic disk 15.

Next, the recorded test pattern is read and the amplitude of the signal measured is stored for future use. After measuring and storing the amplitude of a signal read at track t, the read/write transducer is moved to track t+1, the centerline of which is indicated by 19 which is a distance d from the centerline of track location t. The distance d is, at the outset, established based on the expected minimum track width of a read/write transducer of the type under test. If the read/write transducer has an actual written track width greater than the minimum expected for the device, then in subsequent tests distance d may need to be increased. With the read/write transducer at track t+1, a DC erase signal is written. Next, the read/write transducer is moved to track t−1, the centerline of which is indicated by reference character 20. As in the prior step, the distance d is the minimum expected track width for the read/write transducer under test. At track t−1, a DC erase signal is written. It will of course be appreciated that by writing a DC erase signal at an expected track width distance on opposite sides of track t any portion of the test pattern which extends wider than the expected track width will be erased by the DC erase signals written adjacent to the track.

The read/write transducer is then returned to the original position over track t, the test pattern is read, and the amplitude of the test pattern signal stored for comparison with the amplitude of the test pattern signal measured prior to writing the DC erase signals on opposite sides of track t.

A comparison is now made between the amplitudes of the signal read from track t based on before and after writing to the DC erase signals. Based on the ratio of the signal amplitude after the writing of the DC erase signals to the signal amplitude before, a proportionate ratio is formed to determine the percentage of the signal remaining.

It will, of course, be appreciated that if the head disk assembly includes a plurality of read/write transducer-surface pairs, the measurement will be separately performed for each of those, and steps 4, 5 and 6 of FIG. 1 will also, of course, be repeated in the process of defining the data track locations for each read/write transducer disk surface combination.

Alternatively, rather than using the process described above for measuring track width performance of the read/write transducer, a process using a test procedure to determine the error rate performance at various track pitch values may be utilized to establish the preferred pitch for the data tracks. One example of a technique involving error rate testing is the test referred to by those skilled in the art as the 747 test procedure which provides a measure of the ability of a track to reproduce information reliably as a function of the track pitch. It is, of course, desirable to increase the track pitch to maximize the amount of information which may be stored on a surface. However, as the track pitch is increased, at some point the track-to-track spacing may be so close that the error rates for the tracks are unacceptably high. The 747 test is well known to those skilled in the art and a discussion of this test and the techniques used to implement it is found in a text entitled "Magnetic Disk Drive Technology" by Kanu G. Ashar, published by IEEE Press. The book is cataloged by the following number ISBN 0-7803-1083-7. The discussion is found in the above-noted book at pages 257-259 which, are incorporated herein by reference.

Another useful method of measuring track width performance of the read/write transducer which has been found useful involves writing a first test pattern, followed by reading the first test pattern and measuring the error rate of the signal. Next, a second and third test patterns are written on opposite sides of the first test pattern. The read/write transducer is returned to the track containing the first test pattern and the error rate of the signal is measured. The error rate read after the writing of the second and third test patterns gives an indication of the minimum track width which will be required to provide a suitable and acceptable error rate performance for the read/write transducer keeping in mind the read/write specifications which need to be achieved by the disk drive. Performing the above test provides an indication of the minimum track-to-track spacing which will be possible yet permit an acceptable read/write performance.

Referring again to FIG. 3 as an aid to describing the error rate testing referred to immediately above, the read/write transducer for the associated disk surface is positioned at track t and a first test pattern having a first waveform is written at location t on the surface of magnetic recording disk 15. This first test pattern would preferably be a fixed pattern comprised of combinations of some of the higher frequency transitions. For example, a pattern of 1T, 1T, 2T, 1T and 3T, repeated continuously, where T is equal to the transition time between bits from the encoder, is one which is desirable to use. Next, the error rate of the signal written at track t is measured, which may be done by conventional measurement techniques. Next, the read/write transducer is moved to track position t+1 and a second test pattern is written, this test pattern may be for example a continuous low frequency pattern such as 11T. Following writing of the second test pattern, the read/write transducer is moved to track position t−1 and a third test pattern is written with the read/write transducer, this test pattern may be for example also a low frequency pattern, different than the second test pattern. The third test pattern may be, for example, a continuous 12T pattern in the case where second test pattern is an 11T. The waveforms for the second and third test patterns preferably are different than the waveform for the first test pattern. Additionally, the waveform of the second and third test patterns are not necessarily the same. It is advantageous to use different test patterns for the second and third waveforms to avoid constructive or destructive interference. Next, the read/write transducer is moved to track t and the error rate of the signal measured. Although the primary concern is the error rate of the signal from track t, as an additional step it may be desirable to compare the error rate to the error rate of the signal measured before the second and third test patterns were written. If the error rates are close together, that could indicate a bad read/write transducer. The supported for a rotation about a pivot point indicated at 32. The rotary actuator includes a coil 33, which in conjunction with flux plate assembly and magnet (indicated at 34) serves to position read/write transducer 35 above the surface of disk 26. Read/write transducer 35 may be implemented with, for example, any of the well known types such as magneto resistive (MR), or inductive. Suitable types of read/write transducers, and their construction, are described in Chapters 4-6 of the above-described book by Karin G. Asher. This material appears on pages 70-162 which are incorporated herein by reference.

The rotary actuator of disk drive 25 utilizes a dynamic head loading mechanism which includes lift rod 37 which cooperates with cam surface 38 of cam assembly 39 to provide dynamic load and unload of read/write transducer 35. Integrated circuit 42 includes electronic circuitry used during operation of disk drive 25. The definitional angles and distances illustrated in FIG. 4 correspond to those used in the description of the adaptive zone layout described in the '458 patent. Line 40 indicates the distance between the pivot point 32 of the rotary actuator and the center of rotation C26 of disk 26. This distance is indicated on the drawing by "$D_{am}$". Line 41, which extends from pivot point 32 through the center of read/write transducer 35, illustrates the distance from pivot point 32 to the gap of the read/write transducer 35 (gap not shown). This distance is indicated in the drawing by "$D_{ag}$".

Figure 4:
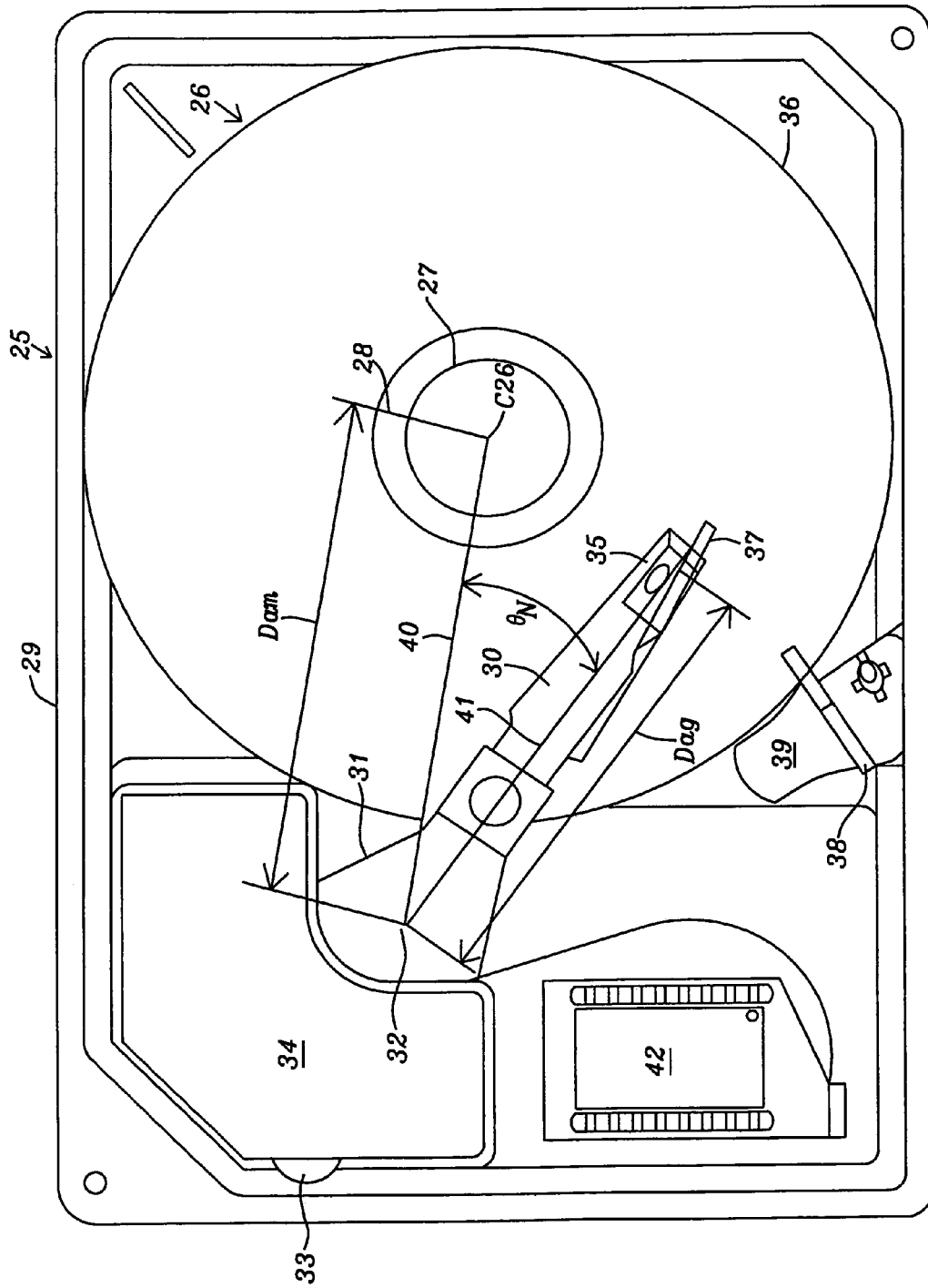
FIG. 4 is a top plan view of a dynamic head loading disk drive.

The rotary actuator, as illustrated in FIG. 4, is positioned between the inner radius (not shown since it is beneath clamp 28) of disk 26 and outer edge 36 of disk 26. For purposes of explanation, the rotary actuator in FIG. 4 is assumed to be positioned at the inner radius (ir) of a zone N the boundary of which is to be calculated. Angle $\theta_N$, the angle between lines 40 and 41, indicates the angle to track N. Since the disk drive of FIG. 4 is a dynamic head loading-type disk drive, the usable outer radius or is determined by the location at which lift tab 37 begins to raise read/write transducer 35 off of the surface of disk 26. Similarly, the usable inner radius (ir) is determined by the inner crash stop (not shown) which is located beneath the top plate of flux plate assembly 34.

FIGS. 5-9 illustrate in flow chart form advantageous construction techniques for disk drives utilizing the variable track width techniques described above in connection with FIGS. 1-4. In manufacturing a disk drive using the present invention, the process flow described in FIG. 1 is first performed to establish a track location formula for each read/write transducer-media surface combination. If the disk drive includes a plurality of read/write transducer-media surface combinations, a formula is established separately for each one of the combinations. After the track location formula is stored in a memory (step 6), the process of manufacturing is continued and may follow several paths. For example, referring to FIG. 5, in the disk drive assembly process illustrated after the track formula relationship has been established, the manufacturing moves to step 1203 in which the head/disk assembly is mated with a circuit board. Next, in step 2401 the boundaries of the data recording zones on the magnetic surface are established based on nominal expected read/write frequency performance of the read/write transducers to be utilized in manufacturing the disk drive. This layout of data zones would follow the technique in which the frequency performance capabilities of the read/write transducer are not measured, but is rather assumed to fall within a range for all read/write transducers being purchased for manufacturing of the disk drive product. A layout using this assumption is described in connection with FIG. 1 of the '458 patent. Next, in step 1208, the read channel filters are optimized for each of the zones, which is followed by the step of certifying the drive and sparing defects in step 1209, and finally a final drive test is performed in step 1210. In the manufacturing process, according to the FIG. 5 flow chart, significant advantages are available because each magnetic media surface is written with the same servo track pitch. This simplifies the manufacturing process since all media surfaces are written with the same servo track pitch rather than having a separate servo track pitch for each surface based on a measured read/write transducer track width performance.

Figure 5:
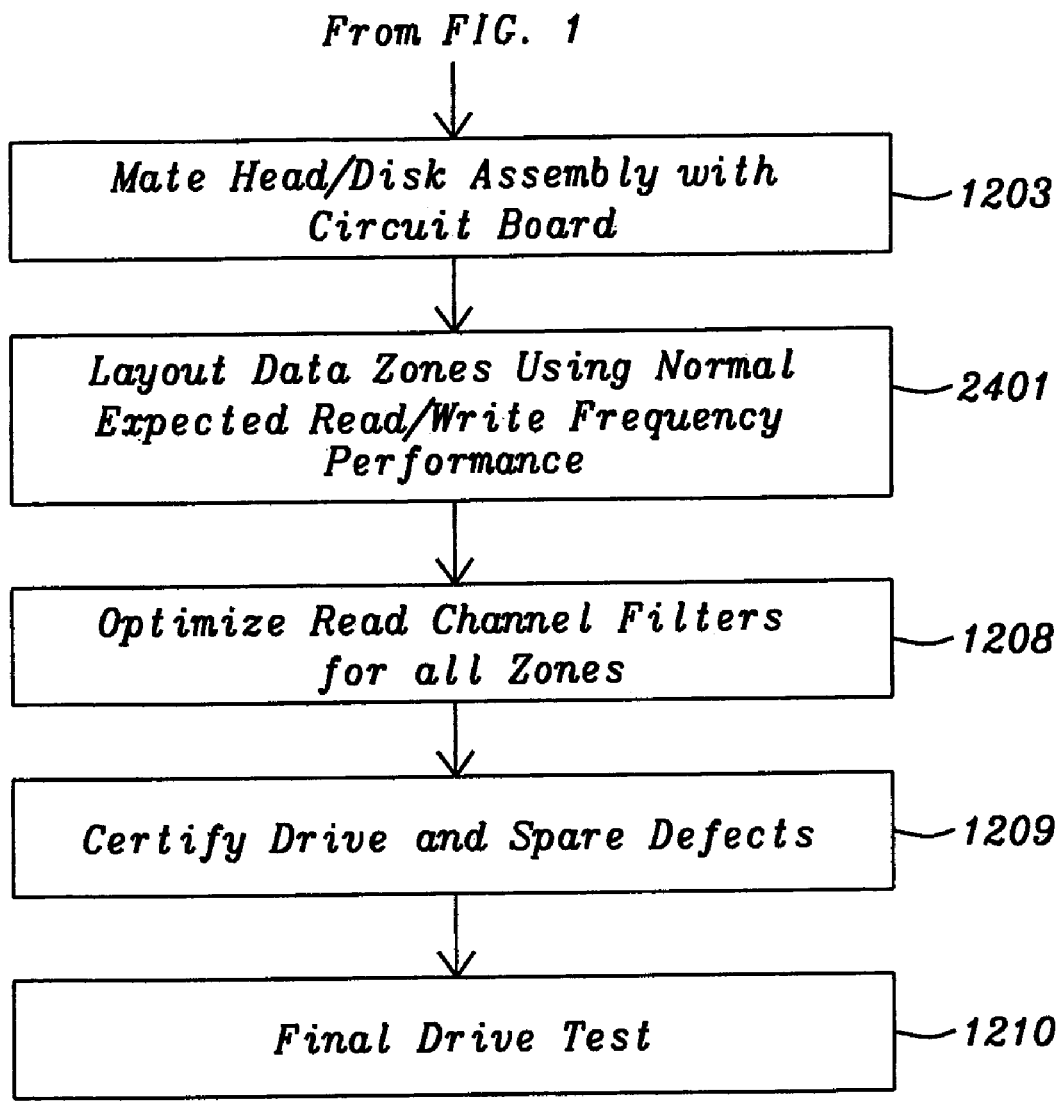
FIGS. 5, 6, 7, 8, and 9 each illustrate flow charts illustrating steps used in practicing the present invention.

In the above manufacturing flow process as illustrated in FIG. 5, it will be noted that the read/write frequency performance for the read/write transducers are assumed to be a nominal value and the performance advantages of measuring the read/write frequency capabilities of each the heads with its associated media surface is not considered. However, as will be appreciated with regard to FIGS. 6, 7, 8 and 9, which are described in detail below, a further improvement in the areal recording density of a disk drive may be achieved by combining the process illustrated in FIG. 1 of this application with the additional processes, such as, for example, measuring the location of the inner and outer crash stops of the disk drive to obtain a measurement of the amount of recording space on a radial basis which is available; and a measurement of the recording density capability of the read/write transducers and adjusting the read/write frequency as appropriate to achieve an improved product.

Figure 6:
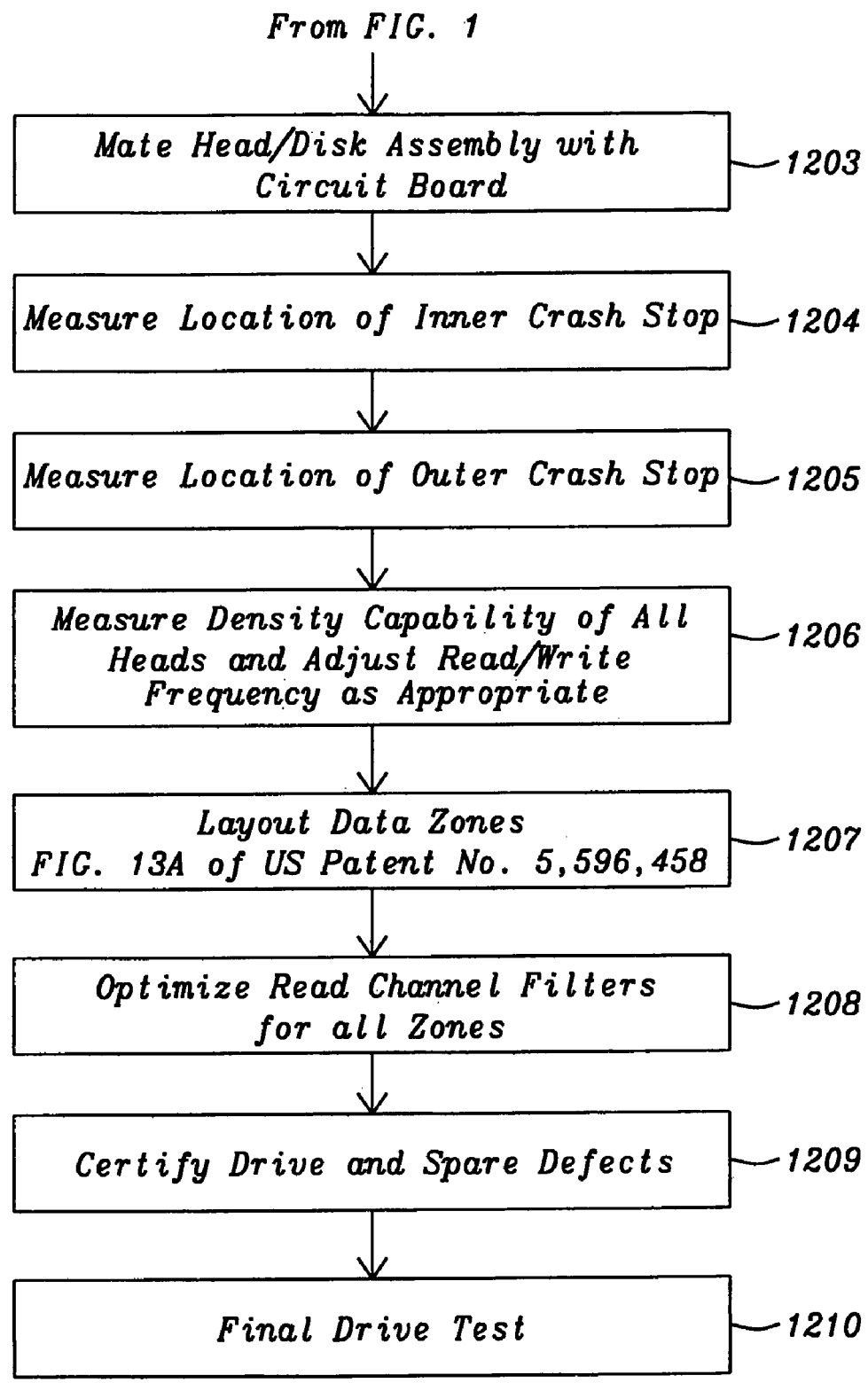

Now turning to FIG. 6, after the completion of step 6 in FIG. 1, the head disk assembly is mated with the circuit board with which it will be associated as illustrated in step 1203. Next, the location of the inner crash stop is measured (step 1204), followed by the measurement of the outer crash stop (step 1205). Next, the density capabilities of each 6), the process of manufacturing is continued and may follow several paths. For example, referring to FIG. 5, in the disk drive assembly process illustrated after the track formula relationship has been established, the manufacturing moves to step 1203 in which the head/disk assembly is mated with a circuit board. Next, in step 2401 the boundaries of the data recording zones on the magnetic surface are established based on nominal expected read/write frequency performance of the read/write transducers to be utilized in manufacturing the disk drive. This layout of data zones would follow the technique in which the frequency performance capabilities of the read/write transducer are not measured, but is rather assumed to fall within a range for all read/write transducers being purchased for manufacturing of the disk drive product. A layout using this assumption is described in connection with FIG. 1 of the '458 patent. Next, in step 1208, the read channel filters are optimized for each of the zones, which is followed by the step of certifying the drive and sparing defects in step 1209, and finally a final drive test is performed in step 1210. In the manufacturing process, according to the FIG. 5 flow chart, significant advantages are available because each magnetic media surface is written with the same servo track pitch. This simplifies the manufacturing process since all media surfaces are written with the same servo track pitch rather than having a separate servo track pitch for each surface based on a measured read/write transducer track width performance.

In the above manufacturing flow process as illustrated in FIG. 5, it will be noted that the read/write frequency performance for the read/write transducers are assumed to be a nominal value and the performance advantages of measuring the read/write frequency capabilities of each the heads with its associated media surface is not considered. However, as will be appreciated with regard to FIGS. 6, 7, 8 and 9, which are described in detail below, a further improvement in the areal recording density of a disk drive may be achieved by combining the process illustrated in FIG. 1 of this application with the additional processes, such as, for example, measuring the location of the inner and outer crash stops of the disk drive to obtain a measurement of the amount of recording space on a radial basis which is available; and a measurement of the recording density capability of the read/write transducers and adjusting the read/write frequency as appropriate to achieve an improved product.

Now turning to FIG. 6, after the completion of step 6 in FIG. 1, the head disk assembly is mated with the circuit board with which it will be associated as illustrated in step 1203. Next, the location of the inner crash stop is measured (step 1204), followed by the measurement of the outer crash stop (step 1205). Next, the density capabilities of each of the heads is measured and the read/write frequency is adjusted as appropriate to maximize the recording density. This is illustrated in FIG. 6 as step 1206 which is described in detail in the '458 patent (which has been incorporated herein by reference). After determining the density capability of the heads and adjusting the read/write frequency, data zones are laid as indicated in step 1207. The process of laying out data zones in step 1207 is described in detail in connection with FIG. 13A of the '458 patent and will not be here repeated. Reference to the '458 patent provides the necessary information to explain this step. Next, the read channel filters for each of these zones are optimized (step 1208), followed by step certify drive and spare defects (step 1209) and the process is completed by performance of a final drive test (step 1210).

Figure 7:
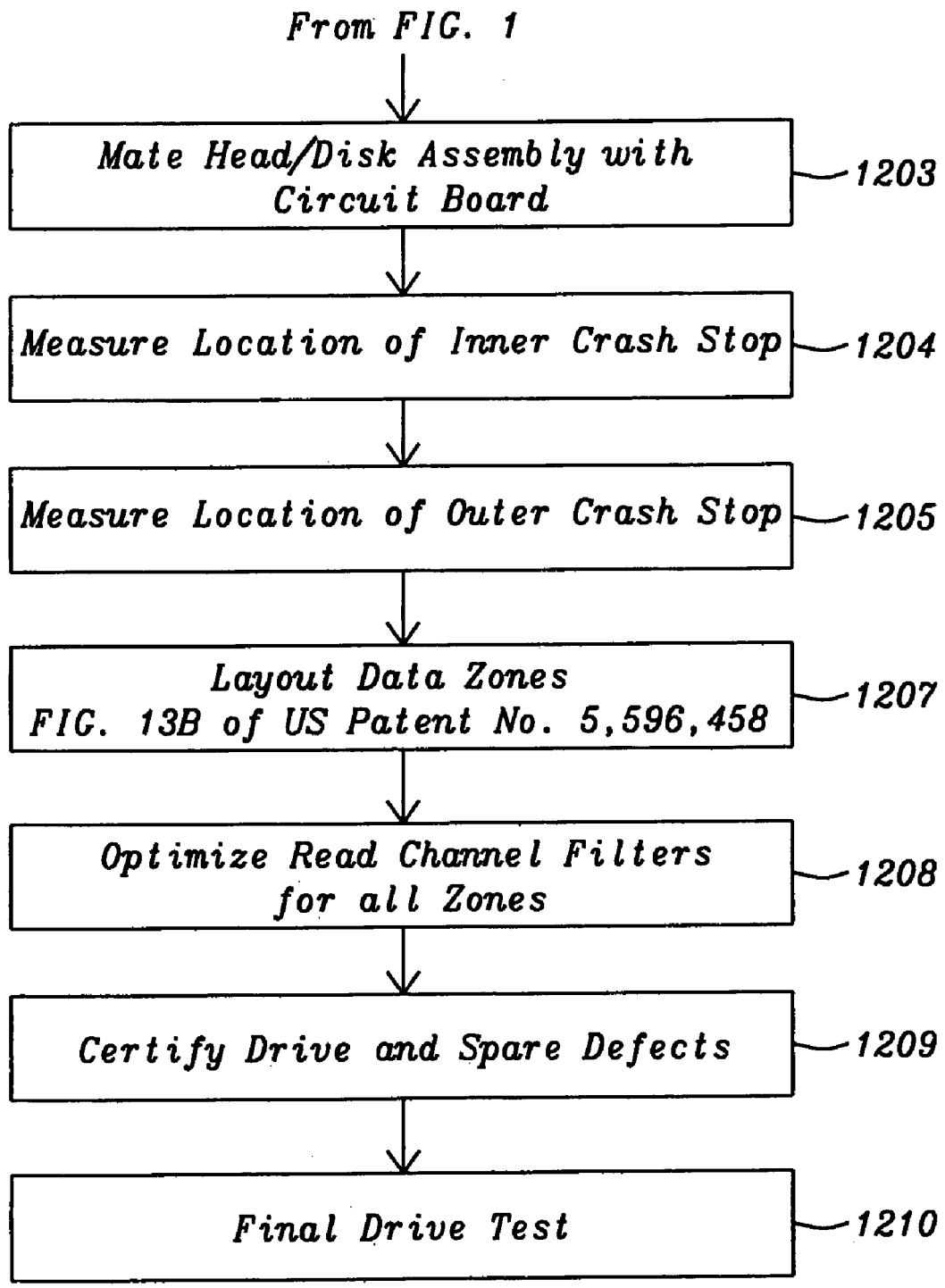

In another method of manufacturing a disk drive in accordance with the present invention, the track location formula each read/write transducer-memory surface pair is determined in the fashion described in connection with FIG. 1, followed by the steps illustrated in FIG. 7. Comparing FIGS. 6 and 7, it will be noted that a number of common steps are included and those steps are indicated by common reference character numbers. In the manufacturing of a disk drive as presented in the flow chart, FIGS. 1 and 7 combined, the data zones are laid out using the technique described in the '458 patent, and in particular as described in connection with FIG. 13B. The manufacturing process illustrated in FIG. 7 shares the advantage of the process illustrated in FIG. 6 in that the manufacturing is simplified in the first instance by the ability to write a common servo track spacing for each of the media surface, followed by the establishment of a data track location formula for each specific read/write transducer-media surface.

Figure 8:
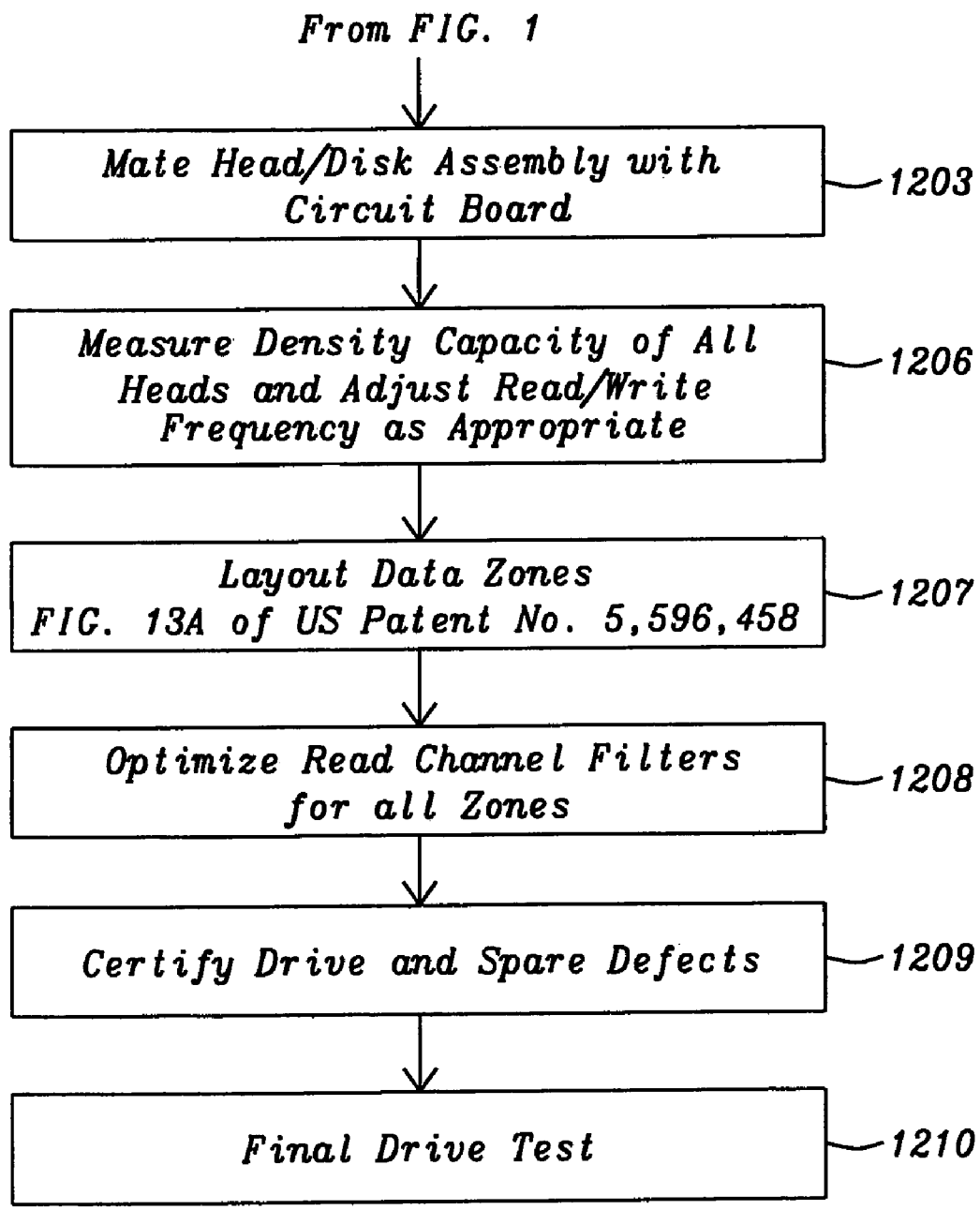

Referring to FIG. 8, the steps illustrated therein in conjunction with those in FIG. 1 (in which a track location formula is ascertained for each read/write transducer-memory surface combination) are utilized with certain steps which are common with those illustrated in, for example, FIG. 6. In the manufacturing process in accordance with the FIG. 8 embodiment, the radial amount of area on the disk for writing of tracks is assumed to be a nominal amount and thus, in contrast to FIG. 6 for example, the location of the inner and outer crash stops are not determined. In other respects, however, the manufacturing process illustrated in FIG. 8 follows that described in FIG. 6, and as is indicated by common reference characters in FIGS. 6 and 8 which indicate common steps.

Figure 9:
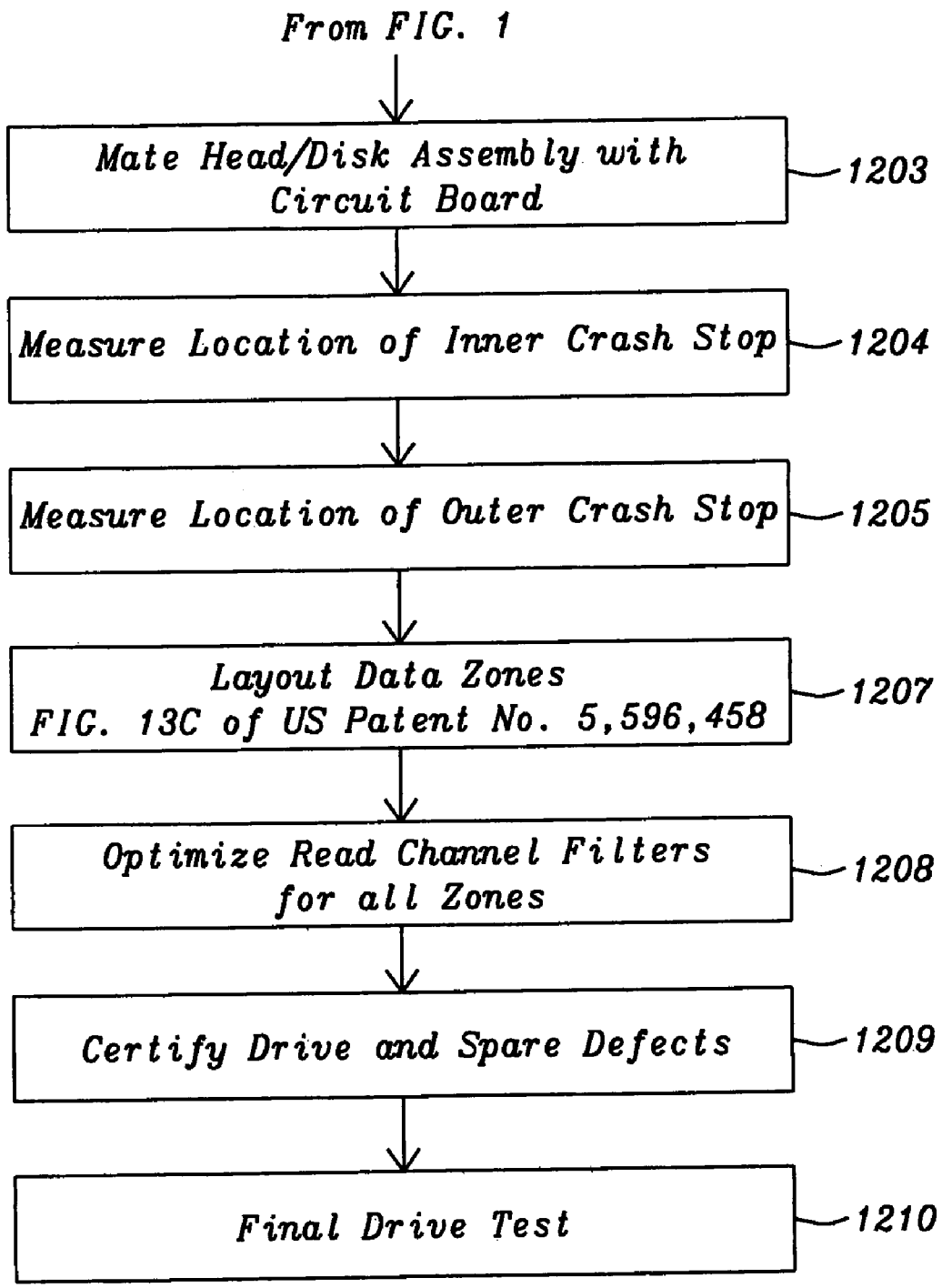

Referring to FIG. 9, an alternative method of manufacturing a disk drive using the present invention is illustrated. In FIG. 9 after the track location formula is ascertained as described in FIG. 1, steps 1203, 1204, 1205, 1207 and 1208, 1209 and 1210 are performed to complete the manufacture of a disk drive. In the method illustrated in FIG. 9, the inner and outer crash stop locations are measured in similar fashion to those steps illustrated in FIGS. 6 and 7. However, following the crash stop location measurements, the data zones are laid out as described in the '458 patent and illustrated in FIG. 13C in connection with that explanation. After defining the layout of the data zones (step 1207) the remaining steps in the process of FIG. 9 are common to those illustrated in FIGS. 5-8, described above.

One of the advantages of the present invention is that a series of disk drives may be produced using common head disk assemblies and drive electronics, that is made from a predetermined set of components, with each drive in the series exhibiting common characteristics, such as storage capacity, even though some of the components, such as heads or media, in the drives do not meet some minimum standards of performance. In producing a series of disk drives using common components, each disk surface can have servo tracks written with a common track pitch, followed by establishing a data track pitch for each read/write transducer-media surface combination which will provide acceptable read/write performance while maximizing the areal storage density. Using this technique, an increased storage capacity of one read/write transducer-media surface combination can compensate for a lesser performing read/write transducer-media surface combination to produce a disk drive meeting a predetermined performance standard, such as, for example, storage capacity. Each read/write transducer-media surface combination can have a different servo-to-data track pitch relationship. This variation in servo-to-data track pitch relationship may exist from drive-to-drive, as well as for each disk surface-read/write transducer combination within the same disk drive. In addition to considering data track spacing, utilizing the recording density capability parameter considerations, one head-media combination may perform sufficiently better than another to permit obtaining a storage capacity goal by better utilizing the recording capacity of a higher performing head-media combination to overcome the deficiencies of the lower performing head-media combination. Since the zone boundary layouts and the recording frequencies used within the zones are established based on performance criteria and the ability of the head media combination to perform, there will be differences in the zone boundary patterns for disks from drive to drive in the series of drives.

Using the optimization techniques which provide customized servo track pitch to data track pitch relationships for each read/write transducer-media surface combination, in addition to utilizing the adaptive zone techniques to take advantage of the recording density capabilities of the read/write transducers, permits the more efficient utilization of drive components, provides a better yield, and achieves reduced manufacturing costs from a like set of components drives of equal capacity may be produced although their internal head disk performances on a corresponding surface to surface basis will vary. The ability to tailor the head-surface performance characteristics as described herein gives a manufacturer great flexibility in producing disk drives from components which inevitably vary in performance, since the ultimate goal is to provide to the user a storage characteristics established for the series, and it is not required that each drive in the series be internally the same from a head-disk recording zone layout standpoint or from the standpoint of data track locations with respect to servo track locations.

What is claimed is:

1. A series of disk drives, each drive in the series being assembled from a predetermined set of components for a head disk assembly and for drive electronics wherein said components may fail to meet minimum standards of performance, said head disk assembly having a disk with a first magnetic surface and a first read/write transducer associated with said first magnetic surface, wherein in a first drive of said series there has been formed on said first magnetic surface a plurality of servo tracks having a track pitch and a plurality of data tracks having a track pitch different than the servo track pitch thereby defining a servo-to-data track pitch relationship; and wherein in a second drive of said series there has been formed on said first magnetic surface a plurality of servo tracks having a track pitch and a plurality of data tracks having a track pitch different than the servo track pitch thereby defining a servo-to-data track pitch relationship and wherein the servo-to-data track pitch relationship of said first magnetic surface of said second drive is different than the servo-to-data track pitch relationship of said first magnetic surface of said first drive of said series whereby said first disk drive and said second disk drive now have a maximized areal storage density and meet acceptable standards of performance.

2. A series of disk drives according to claim 1, wherein the servo track pitch of said first and second drives are equal.

3. A series of disk drives according to claim 1, wherein in each head disk assembly of the drives in the series the disk includes a second magnetic surface and the head disk assembly further includes a second read/write transducer associated with said second magnetic surface, and further wherein in said first drive of said series said second magnetic surface includes a plurality of servo tracks having a track pitch and a plurality of data tracks having a track pitch different from the data track pitch thereby defining a servo-to-data track pitch relationship, wherein said servo-to-data track pitch relationship for said second magnetic surface is different that the servo-to-data track pitch relationship of said first magnetic surface.

4. A series of disk drives according to claim 1, wherein the number of data tracks on said first magnetic surface of said first drive is different than the number of data tracks on said first magnetic surface of said second drive.

5. A series of disk drives, each drive in the series being assembled from a predetermined set of components for a head disk assembly and for drive electronics, said head disk assembly having a disk with a first magnetic surface and a first read/write transducer associated with said first magnetic surface, wherein in a first drive of said series said first magnetic surface includes a plurality of servo tracks having a track pitch and a plurality of data tracks having a track pitch different than the servo track pitch thereby defining a servo-to-data track pitch relationship and a plurality of recording zones, said recording zones having radial boundaries defined according to a first boundary pattern; and wherein in a second drive of said series said first magnetic surface includes a plurality of servo tracks having a track pitch and a plurality of data tracks having a track pitch different than the data track pitch thereby defining a servo-to-data track pitch relationship and a plurality of recording zones, said recording zones having radial boundaries defined according to another boundary pattern which is different than said first boundary pattern and wherein said servo-to-data track pitch relationship of said first magnetic surface of said first drive is different than said servo-to-data track pitch relationship of said first magnetic surface of said second drive.

6. A series of disk drives according to claim 5, wherein in each head disk assembly of the drives in the series the disk includes a second magnetic surface and the head disk assembly further includes a second read/write transducer associated with said second surface, and further wherein in said first drive of said series said second magnetic surface includes a plurality of servo tracks, a plurality of data tracks, and a plurality of recording zones, said recording zones having radial boundaries defined according to a second boundary pattern different than said first boundary pattern.

7. A series of disk drives according to claim 6, wherein said second boundary pattern is different than said another boundary pattern.

8. A series of disk drives according to claim 6, wherein in said second disk drive of said series said second recording surface includes a plurality of recording zones having radial boundaries defined according to a third boundary pattern, wherein said third boundary pattern is different than said another boundary pattern.

9. A series of disk drives according to claim 8, wherein said third boundary pattern is different than said first boundary pattern.

10. A series of disk drives according to claim 8, wherein said third boundary pattern is different than said second boundary pattern.

11. A series of disk drives according to claim 5, wherein said first and second drives of said series have an equal data storage capacity, and further wherein the number of data tracks on said first recording surface of said first drive is different than the number of data tracks on said first recording surface of said second drive.

12. A series of disk drives according to claim 6, wherein said first surface of said first drive has a first data storage capacity and said second surface of said first drive has a second data storage capacity, and further wherein said first data storage capacity is different than said second data storage capacity.

13. A series of disk drives according to claim 6, wherein each of said surfaces of said first and second drives has a data storage capacity, wherein the total data storage capacity of said first drive is equal to the total data storage capacity of said second drive, and further wherein the data storage capacity of one surface of said first drive is different than the data storage capacity of at least one surface of the second drive.

14. A disk drive comprising a disk having a first magnetic surface, a first read/write transducer associated with said first magnetic surface for reading and writing data in tracks in a plurality of zones, each zone having a read/write frequency, a first load beam for supporting and positioning said first read/write transducer at a plurality of locations above said first surface, said disk being further characterized by (a) servo information being written on tracks on said surface at a servo track pitch;

(b) data tracks being established on said surface at a data track pitch, wherein (c) said servo track pitch and said data track pitch are a function of a measured performance of said first read/write transducer.

15. A disk drive according to claim 14, wherein said disk drive includes a formula for determining
a data track location as a function of a servo track location.

16. A disk drive according to claim 15, wherein said data track location formula is stored in a memory.

17. A disk drive according to claim 14, wherein said measured performance of said first read/write transducer with respect to said first magnetic surface includes a measured recording density capability; and wherein
radial boundaries and a read/write frequency for each zone are established as a function of said recording density capability of the first read/write transducer.

18. A disk drive according to claim 14, wherein
a measured distance of travel of said read/write transducer is used to determine a number of data tracks available.

19. A disk drive according to claim 18, wherein
radial boundaries of said plurality of zones are defined as a function of the number of data tracks available.

20. A disk drive according to claim 17, wherein
said measured recording density capability of the first read/write transducer is compared with a target level of performance and a read/write frequency for the read/write transducer is adjusted if the measured performance is below the target performance level.

21. A disk drive according to claim 17, wherein the recording density performance capability of said first read/write transducer is measured at one radial location.

22. A disk drive according to claim 17, wherein the recording density performance capability is measured at a plurality of radial locations.

23. A disk drive according to claim 17, wherein the recording density performance capability is measured at one read/write frequency.

24. A disk drive according to claim 17, wherein the recording density performance capability is measured at a plurality of read/write frequencies.

* * * * *